(12) United States Patent
Kaushik et al.

(10) Patent No.: US 9,730,125 B2
(45) Date of Patent: Aug. 8, 2017

(54) AGGREGATED BEACONS FOR PER STATION CONTROL OF MULTIPLE STATIONS ACROSS MULTIPLE ACCESS POINTS IN A WIRELESS COMMUNICATION NETWORK

(71) Applicant: Meru Networks, Sunnyvale, CA (US)

(72) Inventors: Anil Kaushik, Bangalore (IN); Srivatsan Sankaranarayanan, Bangalore (IN); Vaduvur Bharghavan, Morgan Hill, CA (US); Sung-Wook Han, Sunnyvale, CA (US); Joseph Epstein, Pleasanton, CA (US); Berend Dunsbergen, San Jose, CA (US); Saravanan Balasubramaniyan, Los Gatos, CA (US)

(73) Assignee: Fortinet, Inc., Sunnyvale, CA (US)

( * ) Notice: Subject to any disclaimer, the term of this patent is extended or adjusted under 35 U.S.C. 154(b) by 321 days.

(21) Appl. No.: 14/504,403

(22) Filed: Oct. 1, 2014

(65) Prior Publication Data
US 2015/0124774 A1 May 7, 2015

Related U.S. Application Data

(63) Continuation-in-part of application No. 14/337,184, filed on Jul. 21, 2014, which is a continuation of
(Continued)

(51) Int. Cl.
*H04W 4/00* (2009.01)
*H04W 36/18* (2009.01)
(Continued)

(52) U.S. Cl.
CPC .............. *H04W 36/18* (2013.01); *H04W 4/06* (2013.01); *H04W 8/26* (2013.01); *H04W 48/12* (2013.01); *H04W 48/20* (2013.01); *H04W 84/12* (2013.01)

(58) Field of Classification Search
CPC ........... H04W 4/06; H04W 8/02; H04W 8/26; H04W 28/08; H04W 36/18
See application file for complete search history.

(56) References Cited

U.S. PATENT DOCUMENTS

| | | | | |
|---|---|---|---|---|
| 2003/0206532 | A1* | 11/2003 | Shpak ................. | H04J 13/0048 370/322 |
| 2004/0141617 | A1* | 7/2004 | Volpano ............. | H04L 12/4625 380/270 |

(Continued)

*Primary Examiner* — Derrick Ferris
*Assistant Examiner* — Farhad Ali
(74) *Attorney, Agent, or Firm* — Law Office of Dorian Cartwright; Dorian Cartwright

(57) ABSTRACT

A technique for providing per station control of multiple stations in a wireless network across multiple access points. A look-up table that assigns a station connected to the access point and at least one communication parameter to each of a plurality of persistent, uniquely-assigned BSSIDs (Basic Service Set Identifiers) is stored. An access point responds to messages addressed one of the plurality of persistent, uniquely-assigned BSSIDs and ignores messages addressed to other BSSIDs. Persistence of the BSSID allows the controller to maintain individual control over each station after moving to a second access point of the plurality of access points. A frame comprising the plurality of BSSIDs corresponding to each connected station aggregated into the frame is generated. The frame is transmitted to the plurality of stations. Responsive to a station of the plurality of stations being handed-off to a different access point, a uniquely-assigned BSSID corresponding to the station is deleted from the look-up table.

19 Claims, 10 Drawing Sheets

Related U.S. Application Data application No. 12/913,584, filed on Oct. 27, 2010, now Pat. No. 8,787,309, which is a continuation of application No. 11/715,287, filed on Mar. 7, 2007, now Pat. No. 7,826,426, which is a continuation of application No. 11/298,864, filed on Dec. 9, 2005, now abandoned, which is a continuation-in-part of application No. 11/294,673, filed on Dec. 5, 2005, now Pat. No. 8,160,664.

(51) Int. Cl.
| | | |
|---|---|---|
| *H04W 8/26* | (2009.01) | |
| *H04W 4/06* | (2009.01) | |
| *H04W 48/12* | (2009.01) | |
| *H04W 48/20* | (2009.01) | |
| *H04W 84/12* | (2009.01) | |

(56) References Cited

U.S. PATENT DOCUMENTS

2005/0043027 A1* 2/2005 Emeott ............ H04W 52/0229
　　　　　　　　　　　　　　　　　　　　　455/435.1
2007/0258384 A1* 11/2007 Sammour ............ H04W 36/24
　　　　　　　　　　　　　　　　　　　　　370/252

* cited by examiner

AGGREGATED BEACONS FOR PER STATION CONTROL OF MULTIPLE STATIONS ACROSS MULTIPLE ACCESS POINTS IN A WIRELESS COMMUNICATION NETWORK

CROSS-REFERENCE TO RELATED APPLICATIONS

This application is a continuation-in-part of U.S. patent application Ser. No. 14/337,184, filed Jul. 21, 2014, which is a continuation of U.S. patent application Ser. No. 12/913,584 filed Oct. 27, 2010, now issued U.S. Pat. No. 8,787,309, which is a continuation of U.S. patent application Ser. No. 11/715,287 filed Mar. 7, 2007, now issued U.S. Pat. No. 7,826,426, claims priority of the following document(s), collectively sometimes referred to herein as the "Incorporated Disclosure". Each of these documents forms a part of this disclosure, and is hereby incorporated by reference as if fully set forth herein. U.S. patent application Ser. No. 11/298,864, filed Dec. 9, 2005, in the name of inventors Vaduvur Bharghavan, Sung-Wook Han, Joseph Epstein, Berend Dunsbergen, and Saravanan Balasubramanian, and assigned to the same assignee, titled "Seamless Mobility in Wireless Networks," now abandoned. U.S. patent application Ser. No. 11/294,673, filed Dec. 5, 2005, in the name of inventors Rajendran Venugopalachary, Senthil Palanisamy, Srinith Sarang, and Vaduvur Bharghavan, and assigned to the same assignee, titled "Omni-Directional Antenna Supporting Simultaneous Transmission and Reception of Multiple Radios with Narrow Frequency Separation", now issued U.S. Pat. No. 8,160,664, the content of which is incorporated herein by reference in its entirety.

FIELD OF THE INVENTION

The invention relates generally to wireless computer networking, and more specifically, to providing per station control of multiple stations across multiple access points.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in stations such as laptop computers, tablet computers, smart phones, and network appliances.

Stations complying with standards such as IEEE 802.11 have control over how a connection to wireless network is made. Namely, a station selects an access point among a number of access points that have sent out beacons advertising a presence. The beacon includes a BSSID (Basic Service Set Identifier) as an identifier of the access point. In turn, the station sends data packets which include the BSSID of the intended access point. Unintended access points receiving a transmission merely ignore the data packets.

One technique to address this issue is to download customized software to a station. But reconfiguration of stations running on a station is not always desirable. For instance, guests connecting to a public hot spot for only one time would be burdened with the process of downloading and installing a client during a short connection. Furthermore, many computer users are weary about malicious applications downloaded from the Internet.

Another technique to address this issue, known as virtual port, assigns a BSSID to each station in order to set uplink parameters. Unfortunately, the overhead of virtual port is prohibitive for scaling because regular beacons are sent out for each BSSID to maintain synchronization with an access point. In larger deployments, the occurrence of still beacons increase as the requirement for individual beacons required over each period cannot be met. Consequentially, degradation of station connectivity can occur, for instance, when 20 or more wireless stations are connected to the access point.

What is needed is a robust technique to provide a more scalable solution for per station control of multiple stations across multiple access points in a wireless communication network.

SUMMARY

These shortcomings are addressed by the present disclosure of methods, computer program products, and systems for providing per station control of multiple stations across multiple access points in a wireless communication network. Aggregated beacons with multiple BSSIDs (Basic Service Set Identifiers) can maintain connections for multiple stations without requiring separate beacons, for example, according to protocols such as IEEE 802.11k, IEEE 802.11v and IEEE 802.11r (collectively referred to herein as "IEEE 802.11 kvr").

In an embodiment, a look-up table that assigns a station connected to the access point and at least one communication parameter to each of a plurality of persistent, uniquely-assigned BSSIDs is stored. An access point responds to messages addressed to one of the plurality of persistent, uniquely-assigned BSSIDs and ignores messages addressed to other BSSIDs of other access points. Uniqueness of BSSIDs allows the controller to individualize communication parameters for specific stations. Persistence of the BSSIDs allows the controller to maintain individual control over each station moving across different access point of the plurality of access points.

In one embodiment, the plurality of BSSIDs corresponding to each connected station is aggregated into the frame when generated. For example, the frame can be compliant with a Multiple BSSID element of the IEEE 802.11 standards. The frame is then transmitted to the plurality of stations connected to an access point in order to connect, or maintain connections with an access point. Alternatively, BSSIDs can be sent in responses to probes received from a station. Responsive to a station of the plurality of stations being handed-off to a different access point, a uniquely-assigned BSSID corresponding to the station is deleted from the look-up table.

Advantageously, virtual port control is scalable for large deployments, and without the overhead of sending individual beacons for each station of a deployment.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for providing per station control of multiple stations across multiple access points in a wireless communication network. For example, uniquely-assigned and persistent BSSIDs (Basic Service Set Identifiers) can be aggregated into a Multiple BSSID element according to IEEE 802.11 specifications. Additionally, one of ordinary skill in the art will recognize that many other scenarios are possible, as discussed in more detail below.

Systems to Provide Per Station Control of Multiple Stations Across Multiple Access Points (FIGS. 1-5)

Figure 1:
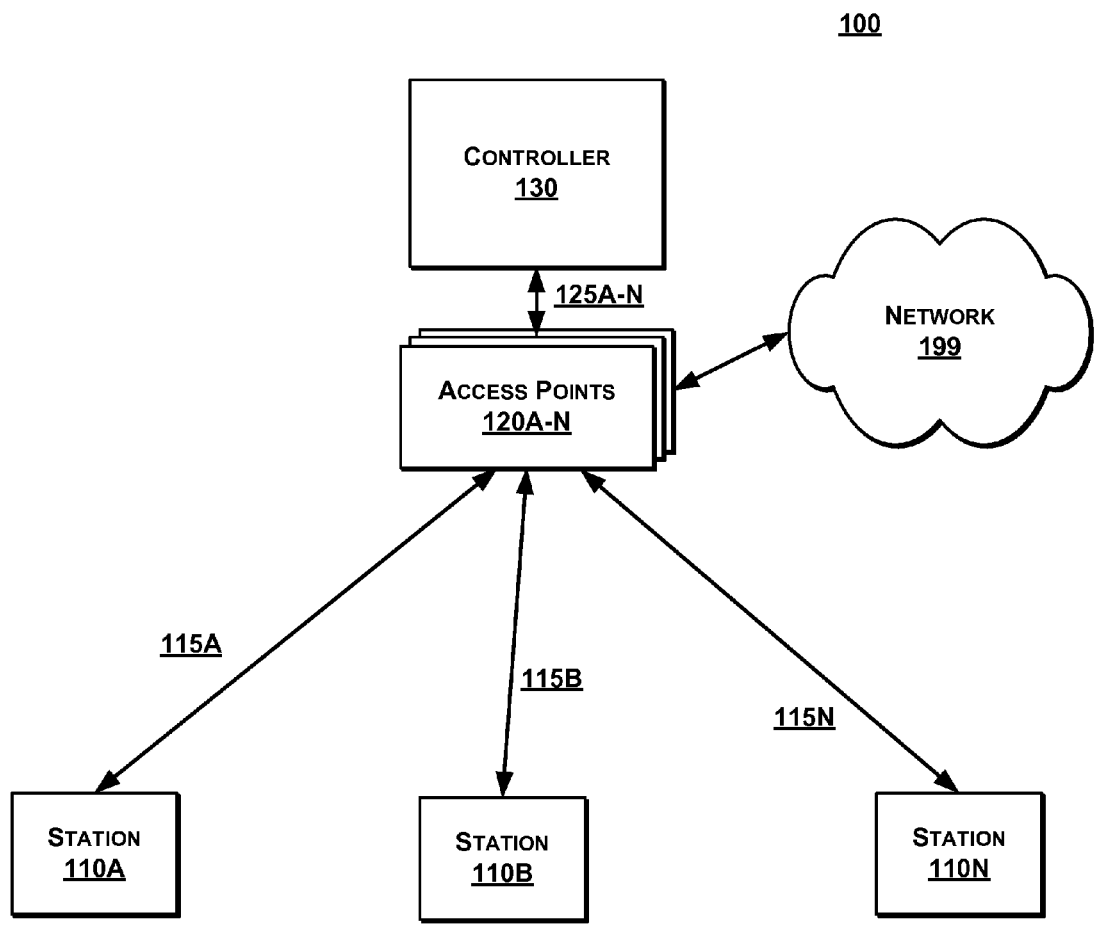
FIG. 1 is a high-level block diagram illustrating a system to provide per station control of multiple stations across multiple access points, according to one embodiment.

FIG. 1 is a high-level block diagram illustrating a system 100 to provide per station control of multiple stations across multiple access points, according to one embodiment. The system 100 comprises stations 110A-N, access points 120A-N, and a controller 130. The components can be coupled to a network 199, such as the Internet, a local network or a cellular network, through any suitable wired (e.g., Ethernet) or wireless (e.g., Wi-Fi or 4G) medium, or combination. In a preferred embodiment, the stations 110A-N are coupled to the access points 120A-N through a wireless communication channel 115A-N while the access points 120A-N can be coupled to the controller 130 through a wired network 125 (e.g., Ethernet network). Other embodiments of communication channels are possible, including a cloud-based controller, and hybrid networks. Additional network components can also be part of the system 100, such as firewalls, virus scanners, routers, switches, application servers, databases, and the like. In general, the stations 110A-N use communication channels 115A-N for uplink (and downlink) access to local and/or external networks.

Figure 9:
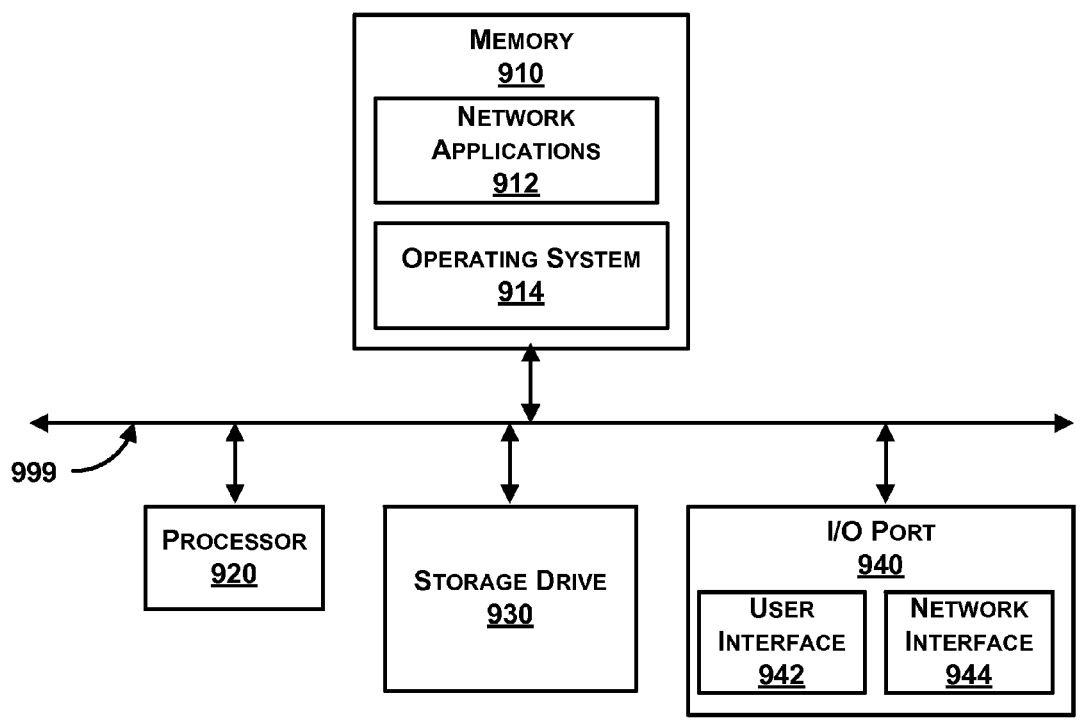
FIG. 9 is a block diagram illustrating an exemplary computing device, according to one embodiment.

The controller 130 can be implemented in any of the computing devices discussed herein (e.g., see FIG. 9). For example, the controller 130 can be an MC1500 or MC6000 device by Meru Networks of Sunnyvale, Calif. In operation, the controller 130 communicates with each of the access point 120 to direct parameters for each of the stations 110A-N. Moreover, the controller 130 determines, in one embodiment, which access point of many should communicate with a particular one of the stations 110A-N, among other things. The controller 130 can also solely or jointly determine parameters for each station. In one example, the controller 130 varies the parameters based on a top-level network view of traffic and congestion (i.e., provide less access during heavy traffic and more during light traffic). The controller 130 can also track the stations 110A-N through connections to different access points and enforce the same parameters after hand-offs. Additional embodiments of the controller 130 are discussed with respect to FIG. 3.

To implement virtual port functionality for per station control of the stations 110A-C, in an embodiment, the controller 130 can maintain a global look-up table or database with a global view (e.g., network-wide view) of connected stations and other devices. The global look-up table stores a uniquely-assigned BSSID for each station configured for virtual port. All or some stations can be so configured. Additionally, the global look-up table stores parameters, for each BSSID, shared or not. Alternatively, a list of BSSIDs can be stored and stations are associated and de-associated therewith. In one embodiment, a BSSID is generated to be unique by incorporating a device-unique identification, such as a MAC address of a station. The controller 130 sends a BSSID to a selected access point to initiate the association. In one example, a BSSID is a 48-bit field of the same format as an IEEE 802 MAC address that uniquely identifies a BSS (Blind Service Set).

The controller 130 provides seamless mobility functionality for hand-offs between access points while maintaining the same BSSID, in one embodiment. In further detail, a station can be handed-off from one access point to another access point by the controller 130 de-associating the former access point and associating the new access points. The hand-off can be substantially transparent to the affected station because although a different access point is responding to communications, the BSSID persists.

Accordingly, the full-featured virtual port functionality with seamless mobility is enabled with BSSIDs that are both uniquely-assigned across all devices on the system 100 and persistent through hand-offs between the access points 120A-N.

Algorithms to initially set parameters, to adjust the parameters, and to determine which access point is assigned to a particular station are all implementation-specific. In one example, the controller 130 discriminates parameters for particular users or groups of users (e.g., CEO, network administrator, authenticated user, guest, suspicious station, etc.), for particular types of computers (e.g., critical data server, rarely-accessed archival data storage, etc.), for particular types of traffic (streaming high-definition (HD) video, low bandwidth video, secure data, voice, best effort, background, etc.), and the like. Initial default parameters can be uniform and adjusted once the access point 120 gathers more information about a particular station such as traffic patterns. For instance, over use by a particular station can be controlled. More detailed embodiments of the controller 130 are set forth below with regards to FIG. 3.

The access points 120A-N include one or more individual access points implemented in any of the computing devices discussed herein (e.g., see FIG. 9). For example, the access points 120A-C can be an AP 110 or AP 433 (modified as discussed herein) by Meru Networks of Sunnyvale, Calif. A network administrator can strategically place the access points 120A-N for optimal coverage area over a locale. The access points 120A-N can, in turn, be connected to a wired hub, switch or router connected to the network 199. In another embodiment, the functionality is incorporated into a switch or router.

In operation, the access points 120A-N can maintain a local look-up table with an local view (e.g., access point-wide) of connected stations and other devices. The local look-up table stores BSSIDs assigned by the controller 130. All or some of the BSSIDs can be uniquely-assigned and/or persistent BSSIDs. For virtual port and seamless mobility functionality, the access points 120A-N can receive real-time associations and de-associations for the stations 110A-N. Periodic beacons are transmitted by the access points 120A-N to advertise availability and maintain connections. As such, the access points 120A-N can respond to messages addressed to BSSIDs for the local look-up table and ignore messages addressed to other BSSIDs.

Figure 7:
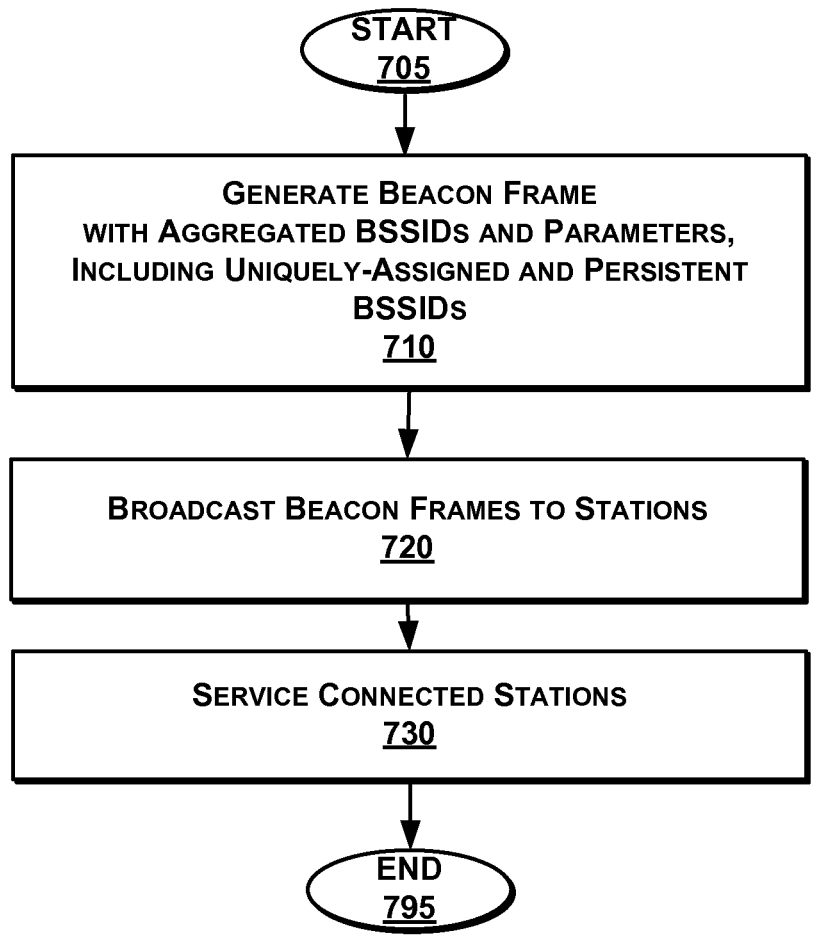
FIG. 7 is a flow diagram illustrating a method for providing per station control of multiple stations across multiple access points from an access point, according to one embodiment.

In one embodiment, the access points 120A-N aggregate multiple BSSIDs into a single beacon. For example, protocols such as IEEE 802.11 kvr inherently support a multiple BSSID element in beacon and probe response. In some cases, aggregated BSSIDs belong to the same class, channel and antennae connector. Optionally, BSSID aggregation can be toggled on and off automatically based on a number of connected stations. Example frame structures are shown in FIG. 7. More detailed embodiments of the access points 120A-N are discussed below with respect to FIG. 4.

The stations 110A-N can be, for example, a personal computer, a laptop computer, a tablet computer, a smart phone, a mobile computing device, a server, a cloud-based device, a virtual device, an Internet appliance, or the like (e.g., see FIG. 9). No special client is needed for this particular technique, although other aspects of the network may require downloads to the stations 110A-N. The stations 110A-N connect to the access points 120A-N for access to, for example, a LAN or external networks. In one embodiment, a child plays video games on a wireless game console as a station in communication with streaming applications from a cloud-based application server. In a different embodiment, an employee authenticates from a laptop as a station over a secure channel of an enterprise network to modify remotely stored secure files. In another embodiment, a guest at a coffee shop uses a smart phone as a station to access a public hot spot to watch stream videos stored on a public web site.

Using the current technique, the stations 110A-N receive beacons from one or more of the access points 120A-N with multiple BSSIDs, including a persistent, uniquely-assigned BSSD used for configuration. Each of the stations 110A-N interacts with a corresponding one of the access points 120A-N under parameters associated a uniquely-assigned, persistent BSSID to which a station is configured.

Figure 2A:
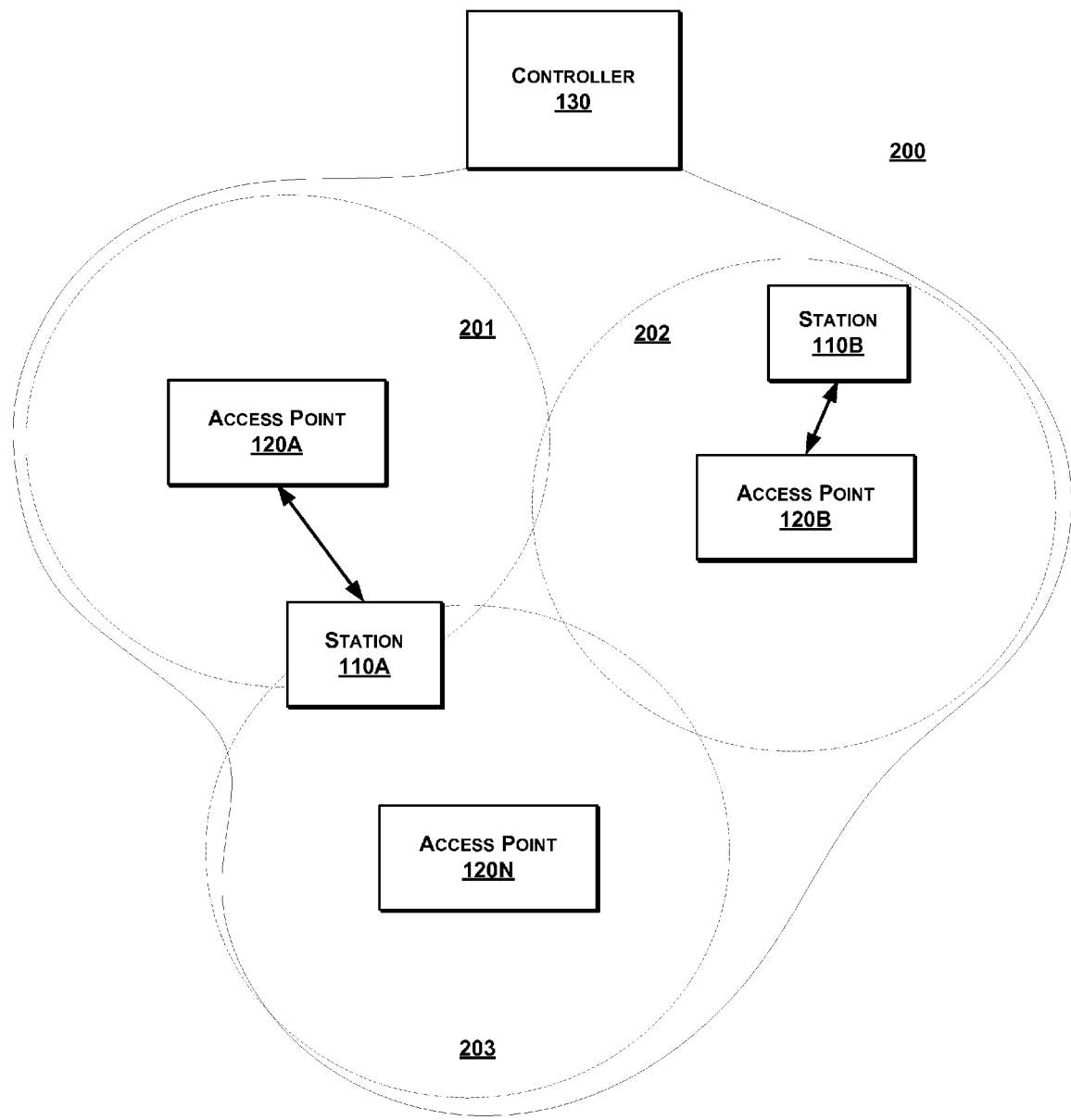
FIGS. 2A-C are high-level block diagrams illustrating a spatial layout of the system of FIG. 1, according to one embodiment.
Figure 2B:
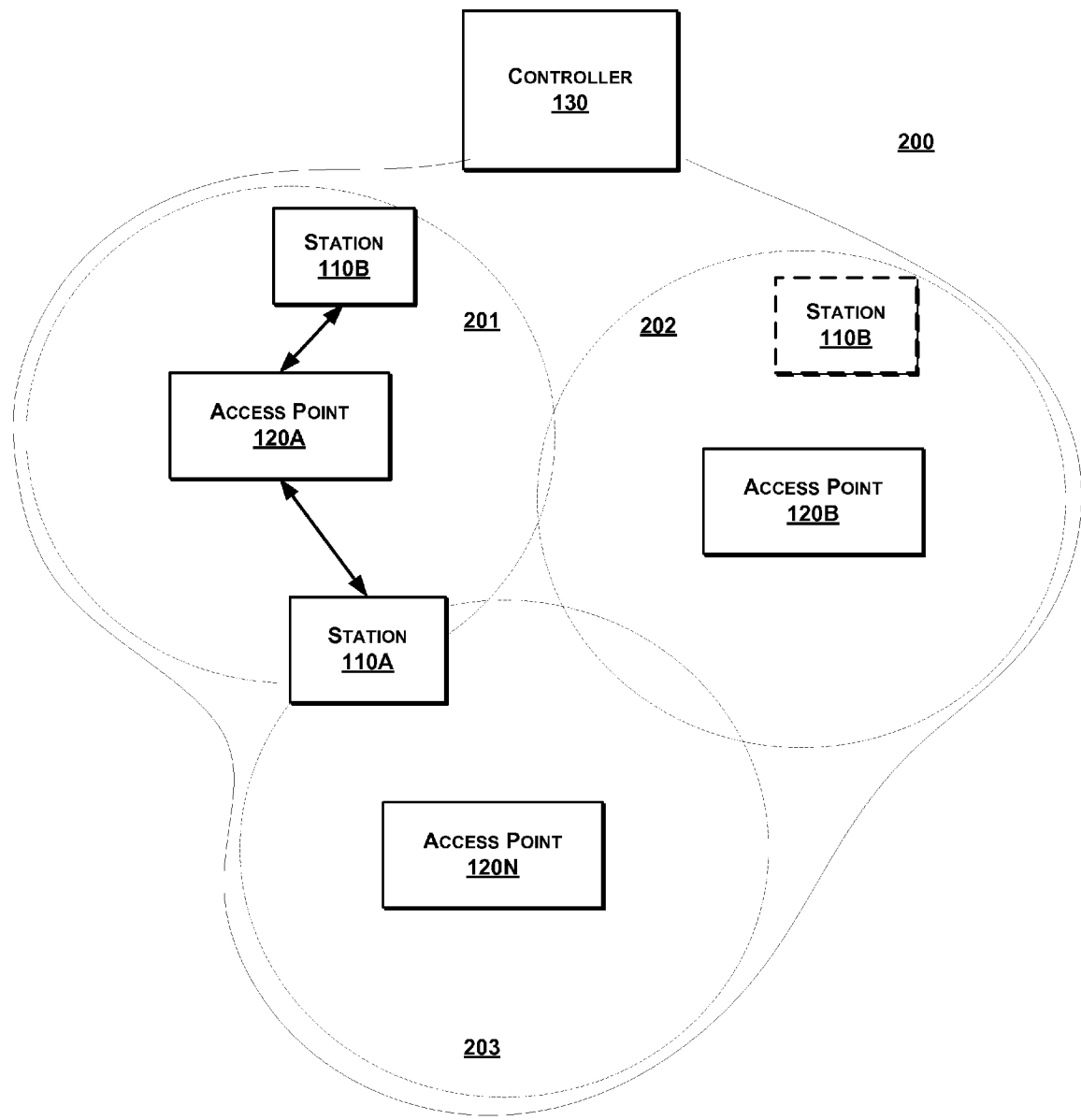
Figure 2C:
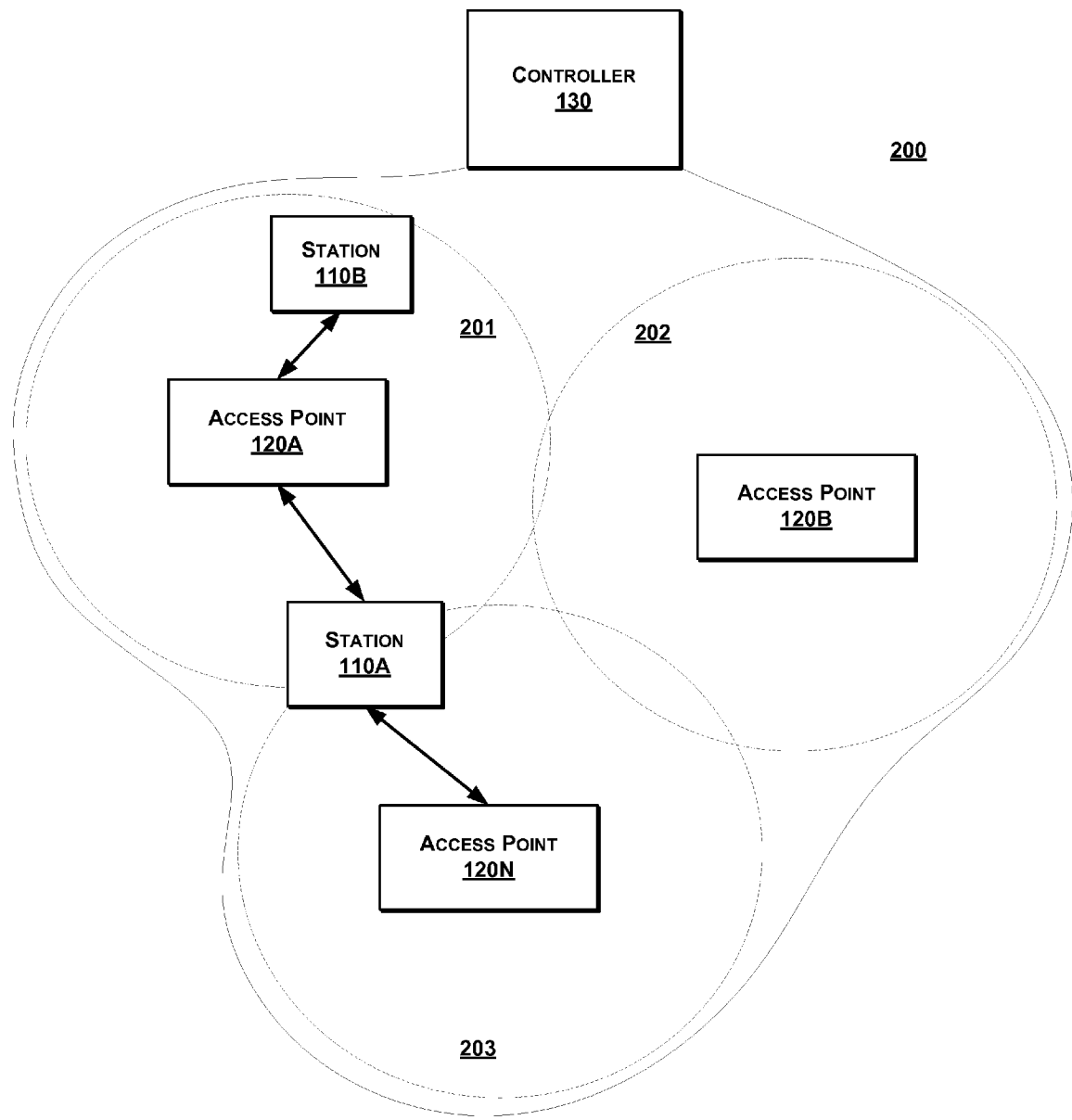

FIGS. 2A-C are diagrams illustrating reconfigurations of stations responsive to changes in conditions, according to some embodiments. Changes can be initiated by the controller 130 or the access points 120A-N. The controller 130 has a network-wide view 200C and the access points 120A, 120B and 120N, have access point-wide views 201, 202 and 203, respectfully. The access point-wide views 201, 202, 203 can be defined by a wireless radio range of respective access points while the network-wide view is not so constrained due to a wired back-end. In operation, the station 110A is within range of both access points 120A and 120N which may both report to the controller 130 that frames from the station 110A have been received. The controller 130 uses an internal algorithm, with factors such as shortest flight time, to select the access point 120A for servicing the station 110A. Various conditions discussed herein can affect the decision.

At a later point in time, in FIG. 2B, station 110B has changed locations such that it is within range of the access point 120A. The controller 130, having a network-wide view 200 is able to identify the station 110B at its new location and continue communication with the same BSSID assigned when connected to the access point 120B, in a manner that is transparent to the station 110B. Separately, and in response to the change in conditions caused by the station 110B also being serviced by the access point 120A, the controller 130 can reduce uplink configurations specifically for the station 110A. The two updates to the access point 120A can be affected by updating the global look-up table and sending changes to the access point 120A.

At an even later point in time, in FIG. 2C, the station 110A has been reassigned to access point 120N by the controller 130. The flight time for data packets may still be less when sent to the access point 110A, but other conditions have triggered the change. For example, a controller can redistribute the processing load from the access point 120A to be partially absorbed by the access point 120N. Moreover, the access point 120N can handle the larger demand for uplink access demand by the station 110A, resulting in an update in uplink configurations that increases the amount of uplink access allowed by the controller 130. Countless additional scenarios are possible.

Figure 3:
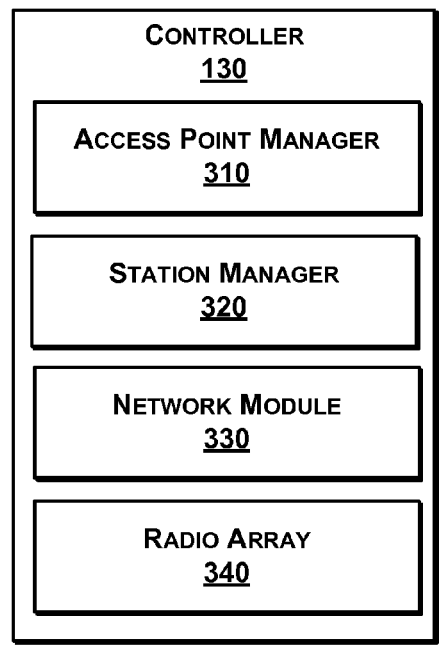
FIG. 3 is a more detailed block diagram illustrating a controller of the system of FIG. 1, according to one embodiment.

FIG. 3 is a more detailed block diagram illustrating a controller 130 of the system 100, according to one embodiment. The controller 130 comprises an access point manager 310, a station manager 320, a network module 330, and radio array 340. The components can be implemented in hardware, software, or a combination of both.

The access point manager 310 logs and directs activities of access points under the controller 130, such as BSSID assignments. In one embodiment, the access point manager 310 determines global conditions that affect BSSID assignments and parameters. The station manager 320 can store and update a global look-up table that associates stations with BSSIDs, and designates some or all as virtual port BSSIDs. The network module 330 can manage higher layer network communications with external network resources. The radio array 340 represents radio frequency (RF) hardware necessary for physical channel access.

Figure 4:
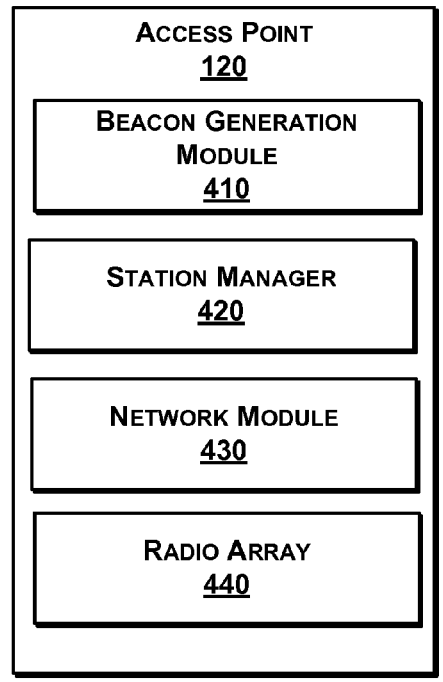
FIG. 4 is a more detailed block diagram illustrating an access point of the system of FIG. 1, according to one embodiment.

FIG. 4 is a more detailed block diagram illustrating an access point 120 of the system 100, according to one embodiment. The access point 120 comprises a beacon generation module 410, a station manager 420, a network module 430, and a radio array 440. The components can be implemented in hardware, software, or a combination of both.

The beacon generation module 410 generates beacons with aggregated BSSIDs, including virtual port BSSIDs. The station manager 420 stores globally and/or locally-influenced parameter values, policy-based parameter values, manually configured parameter values, or the like. Parameter values for historical and predictive stations can be stored in one option. The network module 430 and the radio array 440 can all be similar to the components of the controller 130 of FIG. 3.

Figure 5:
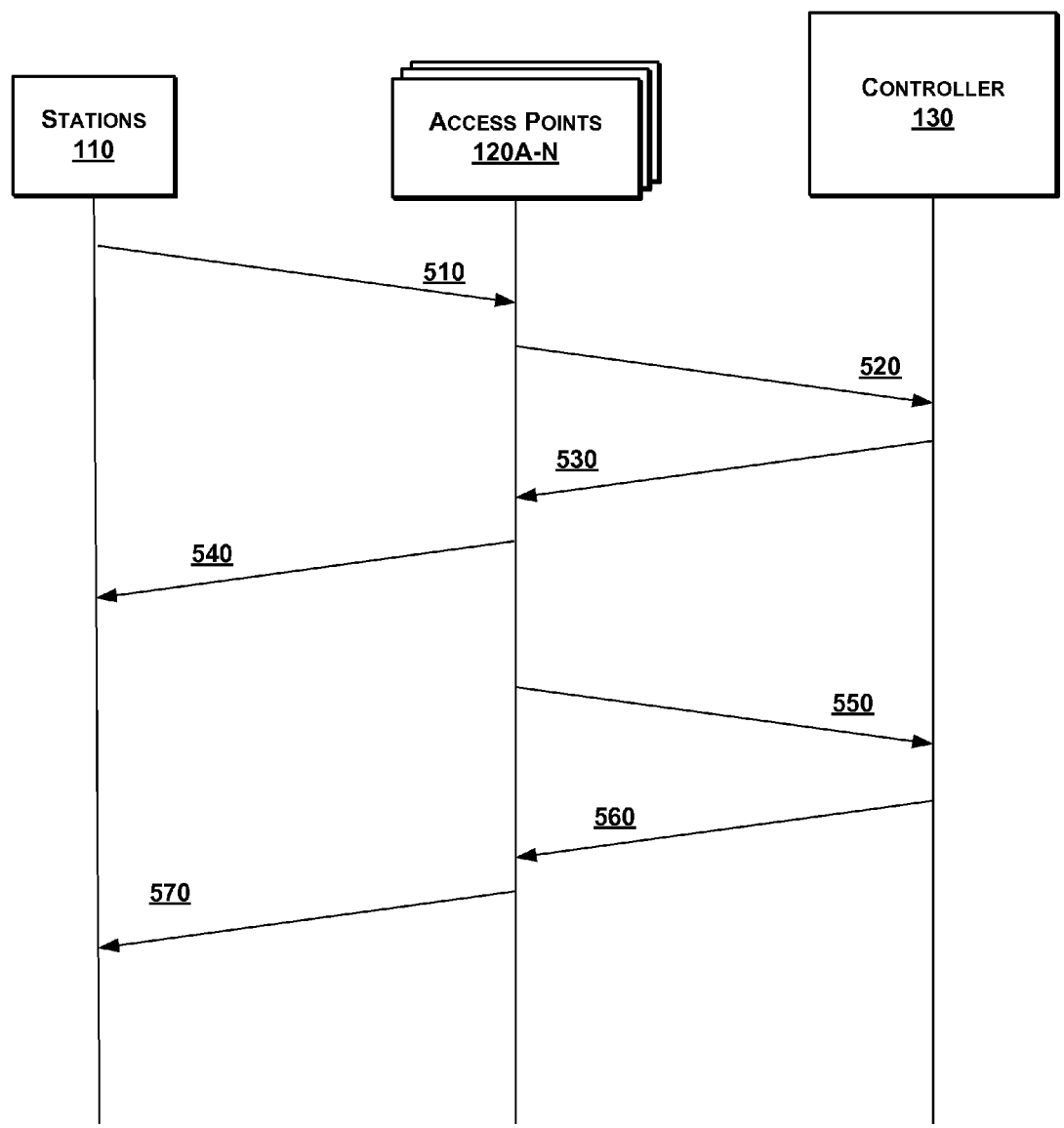
FIG. 5 is a sequence diagram illustrating interactions between components of the system of FIG. 1, according to one embodiment.
Figure 6:
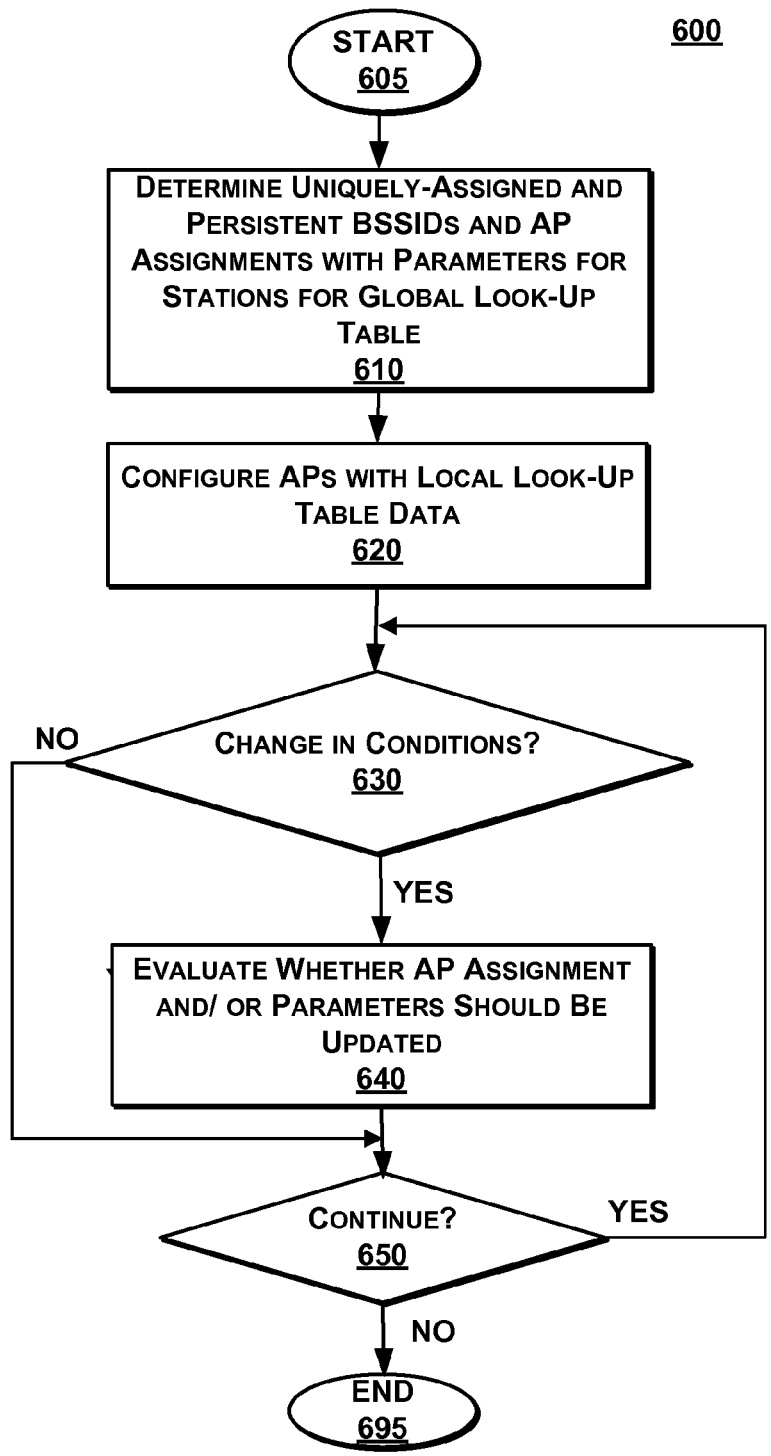
FIG. 6 is a flow diagram illustrating a method for providing per station control of multiple stations across multiple access points from a controller, according to one embodiment.
Figure 8:
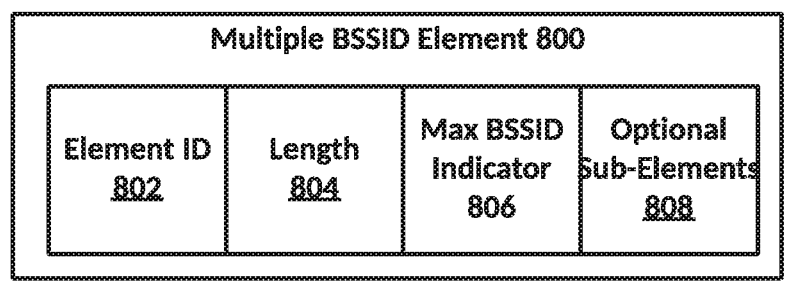
FIG. 8 is a schematic diagram illustrating an exemplary IEEE 802.11 network packet with multiple BSSIDs (Basic Service Set Identifiers), according to one embodiment.

FIG. 5 is a sequence diagram illustrating interactions 500 between components of the system 100 of FIG. 1, according to one embodiment. The interactions represent wireless communications in accordance with IEEE 802.11 standards, and the like. An example of an 802.11 network packet configured for implementation herein is illustrated in FIG. 8. In between the interactions, methods performed within the components of FIG. 5 are illustrated in FIGS. 6 and 7. The illustrated interactions 500 are not intended to be limiting. As such, the interactions 510 to 570 can be a portion of steps from a longer process.

Initially, at interaction 510, the station 110 a probe request to the access point 120, which in turn reports the request to the controller 130, at interaction 520. At interaction 530, the controller 130 configures a particular one of the access point 120 to respond to the probe request at interaction 540 by sending a BSSID. The order of interactions herein can be varied, for example, interaction 530 can occur prior to interaction 510 and without the need for interaction 520.

At a later point in time, at interaction 550, one or more of the access points 120A-N send the controller 130 local condition information. In response, at interaction 560, the controller 130 transfer or updates parameters for the station 110 by sending information to relevant ones of the access points 120A-N, that implement the change to the station in interaction 570 in beacons.

Methods for Providing Per Station Control of Multiple Stations Across Multiple Access Points (FIG. 6-8)

FIG. 6 is a flow diagram illustrating a method 600 for providing per station control of multiple stations across multiple access points from a controller (e.g., the controller 130 of FIG. 1), according to one embodiment.

The method 600 starts at step 610, when uniquely-assigned and/or persistent BSSIDs and access point assignments with parameters for stations are determined. A type of BSSID can be conditioned on whether virtual port is manually or automatically enabled for a system, for a particular station, and/or for a particular station. The data can be stored in a global look-up table, or alternatively, an external database or fast response cache.

At step 620, access points are configured with local look-up table data. The local look-up data can be limited to include stations that are connected, attempting to connect, were formerly connected, or are predicted to connect, to a particular access point. In other embodiments, access points retrieve or receive information as needed from a controller or other resource.

At step 630, responsive to a change in conditions, a controller evaluates whether AP assignments and/or parameters should be updated. As discussed above, global information relating to network load, predicted loads, bandwidth usage, and more can be taken into consideration for updates. Consequently, in an embodiment, changes to one station can occur in response to changes in another station connected to a different access point across the network. The process continues 650 until ended 695 by, for example, a reboot, shut down, or disabling of virtual port.

FIG. 7 is a flow diagram illustrating a method 700 for providing per station control of multiple stations across multiple access points from an access point (e.g., the access points 120A-N of FIG. 1), according to one embodiment.

The method 700 starts 705, at step 710, when a beacon frame with aggregated BSSIDs and parameters is generated. Some or all of the BSSIDs are uniquely-assigned and/or persistent BSSIDs. Some BSSIDs may be supported by a different access point. BSSIDs preferably belong to a same class, channel and antenna connector. One example of a Multiple BSSID element 800 for beacon or probe response frames under IEEE 802.11 kvr is illustrated in FIG. 8. Element ID field 802 identifies the multiple BSSID value. Length 804 has a value of 1 plus the length of the extensions in units of octets. MaxBSSID Indicator 806 indicates the maximum number of BSSIDs supported, although an access point can operate with fewer. A value of n translates to 2^n stations supported, so a value of 3 indicates that 8 BSSIs are supported. The value can be manually configured by a network administrator or automatically, for example, by a controller-based or access-point based algorithm. Optional Sub-elements 808 contains zero or more sub-elements. Each of fields 802, 804 and 806 is one octet in size except the Optional Sub-elements 808 which can be of variable size. Other formats are possible.

At step 720, beacon frames are broadcast to stations. Beacon frames advertise a presence of an access point and keeps connected stations synchronized with parameter information. The beacon frames include the aggregated BSSIDs. Each station can retrieve updated information associated with its BSSID from beacons.

At step 730, connected stations are serviced. Data is sent to and received from stations according to individualized parameters set for a station, such as uplink parameters, and other custom parameters. The process ends 795.

According to some IEEE 802.11 standards, EDCA provides a probabilistic-based, quality of service by grouping traffic into four access classes: voice, video, beset effort and background in respective order of priority. Frames are passed to the MAC layer from upper protocol layers with a priority value set between 0 and 7, which are used for mapping into one of the four access classes. Each class can have a separate transmission queue and medium access parameters. The values of AIFS 752, CW 754 and others ensure priority to the medium.

Generic Computing Device (FIG. 9)

FIG. 9 is a block diagram illustrating an exemplary computing device 900 for use in the system 100 of FIG. 1, according to one embodiment. The computing device 900 is an exemplary device that is implementable for each of the components of the system 100, including the stations 110A-N, the access points 120A-N, and the controller 130. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage device 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include the modules of controllers or access points as illustrated in FIGS. 3 and 4. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage device 930.

The storage device 930 can be any non-volatile type of storage such as a magnetic disc, electrically erasable programmable read-only memory (EEPROM), Flash, or the like. The storage device 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11 ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point of a plurality of access points managed by a controller of a wireless communication network, the method for providing seamless mobility to the plurality of stations in a while maintaining per-station control each station in the plurality of stations, the method comprising:
    storing a look-up table that assigns one or more station connected to the access point and at least one communication parameter to each of a plurality of persistent, uniquely-assigned BSSIDs (Basic Service Set Identifiers), the access point responding to messages addressed one of the plurality of persistent, uniquely-assigned BSSIDs and ignoring messages addressed to other BSSIDs, wherein uniqueness of the BSSID allows individual control over each of the one or more stations and persistence of the BSSID allows the controller to maintain individual control over each of the one or more stations after moving to a second access point of the plurality of access points;
    generating a frame comprising the plurality of BSSIDs corresponding to each of the one or more connected stations aggregated into the frame;
    transmitting the frame to the one or more connected stations;
    responsive to a station of the one or more of stations being handed-off to a different access point, deleting a uniquely-assigned BSSID corresponding to the station from the look-up table; and
    toggling the access point from a first mode to a second mode responsive to surpassing a threshold number of connected stations, wherein the first mode enables aggregated BSSIDs in the frames when generated and the second mode disables aggregated BSSIDs in the frames when generated.

2. The method of claim 1, wherein the frame comprises a beacon broadcast to the plurality of stations.

3. The method of claim 1, wherein the frame comprises a probe response transmitted to a station that sent a probe.

4. The method of claim 1, wherein the frame is compliant with one or more of the IEEE 802.11k protocol, the IEEE 802.11v protocol, and the IEEE 802.11r protocol.

5. The method of claim 1, wherein generating the frame comprises:
    generating the frame to comprise BSSIDs that are persistent and uniquely-assigned, and BSSIDs that are not persistent and uniquely-assigned.

6. The method of claim 1, generating the frame comprises:
    generating the frame to comprise BSSIDs that are serviced by a different access point.

7. The method of claim 1, wherein generating the frame comprises:
    generating the frame to include at least one communication parameter corresponding to each BSSID for each connected station.

8. The method of claim 1, further comprising:
    toggling the access point from a first mode to a second mode, wherein the first mode enables virtual port functionality and the second mode disables virtual port functionality.

9. The method of claim 1, wherein the uniquely-assigned BSSID from a plurality of persistent, uniquely-assigned BSSIDs to associate with the mobile station based on one or more communication parameters of the uniquely-assigned BSSID selected from the group of:
access control parameters, backoff or retry parameters, channel selection parameters, QoS (Quality of Service) parameters, and transit power parameters.

10. A computer-implemented method in a controller managing a plurality of access points of a wireless communication network, the method for providing seamless mobility to the plurality of stations in a while maintaining per-station control each station in the plurality of stations, the method comprising:
storing a look-up table that assigns one or more station connected to the plurality of access points and at least one communication parameter to each of a plurality of persistent, uniquely-assigned BSSIDs (Basic Service Set Identifiers), the plurality of access points responding to messages addressed one of the plurality of persistent, uniquely-assigned BSSIDs and ignoring messages addressed to other BSSIDs, wherein uniqueness of the BSSID allows individual control over each of the one or more stations and persistence of the BSSID allows the controller to maintain individual control over each of the one or more stations after moving to a second access point of the plurality of access points; and
transmitting at least a portion of the look-up table to one of the plurality of access points to allow generation of a frame comprising the plurality of BSSIDs corresponding to each of the one or more connected stations aggregated into the frame,
wherein at least one of the plurality of access points toggles from a first mode to a second mode responsive to surpassing a threshold number of connected stations, wherein the first mode enables aggregated BSSIDs in the frames when generated and the second mode disables aggregated BSSIDs in the frames when generated.

11. The method of claim 10, wherein the frame comprises a beacon broadcast to the plurality of stations.

12. The method of claim 10, wherein the frame comprises a probe response transmitted to a station that sent a probe.

13. The method of claim 10, wherein the frame is compliant with one or more of the IEEE 802.11k protocol, the IEEE 802.11v protocol, and the IEEE 802.11r protocol.

14. The method of claim 10, wherein generation of the frame comprises:
generating the frame to comprise BSSIDs that are persistent and uniquely-assigned, and BSSIDs that are not persistent and uniquely-assigned.

15. The method of claim 10, generation of the frame comprises:
generating the frame to comprise BSSIDs that are serviced by a different access point.

16. The method of claim 10, wherein generating the frame comprises:
generating the frame to include at least one communication parameter corresponding to each BSSID for each connected station.

17. The method of claim 10, further comprising:
receiving updated information from various points around the wireless communication network;
compiling an updated global condition from the updated information; and
updating a parameter for at least one of the plurality of persistent, uniquely-assigned BSSIDs of one or the plurality of stations responsive to the updated global condition, wherein the global condition concerns updated information at an access point other than the access point serving the one of the plurality of stations.

18. The method of claim 10, wherein the uniquely-assigned BSSID from a plurality of persistent, uniquely-assigned BSSIDs to associate with the mobile station based on one or more communication parameters of the uniquely-assigned BSSID selected from the group of:
access control parameters, backoff or retry parameters, channel selection parameters, QoS (Quality of Service) parameters, and transit power parameters.

19. An access point of a plurality of access points managed by a controller of a wireless communication network, to provide seamless mobility to the plurality of stations in a while maintaining per-station control each station in the plurality of stations, the access point comprising:
a processor; and
a memory, comprising:
a first module to store a look-up table that assigns one or more stations connected to the access point and at least one communication parameter to each of a plurality of persistent, uniquely-assigned BSSIDs (Basic Service Set Identifiers), the access point responding to messages addressed one of the plurality of persistent, uniquely-assigned BSSIDs and ignoring messages addressed to other BSSIDs, wherein uniqueness of the BSSID allows individual control over each of the one or more stations and persistence of the BSSID allows the controller to maintain individual control over each of the one or more stations after moving to a second access point of the plurality of access points;
a second module to generate a frame comprising the plurality of BSSIDs corresponding to each of the one or more connected stations;
a third module to transmit the frame to the one or more stations; and
a fourth module to, responsive to a station of the one or more stations being handed-off to a different access point, delete a uniquely-assigned BSSID corresponding to the station from the look-up table,
wherein at least one of the plurality of access points toggles from a first mode to a second mode responsive to surpassing a threshold number of connected stations, wherein the first mode enables aggregated BSSIDs in the frames when generated and the second mode disables.

* * * * *